July 24, 1962 W. HOLZER 3,046,421
IMPULSE DEVICE CONNECTED WITH A MOTOR IN AN AUTOMATIC
CUT-OUT FOR THE PROGRAM CONTROL IN WASHING-MACHINES
Filed March 16, 1960
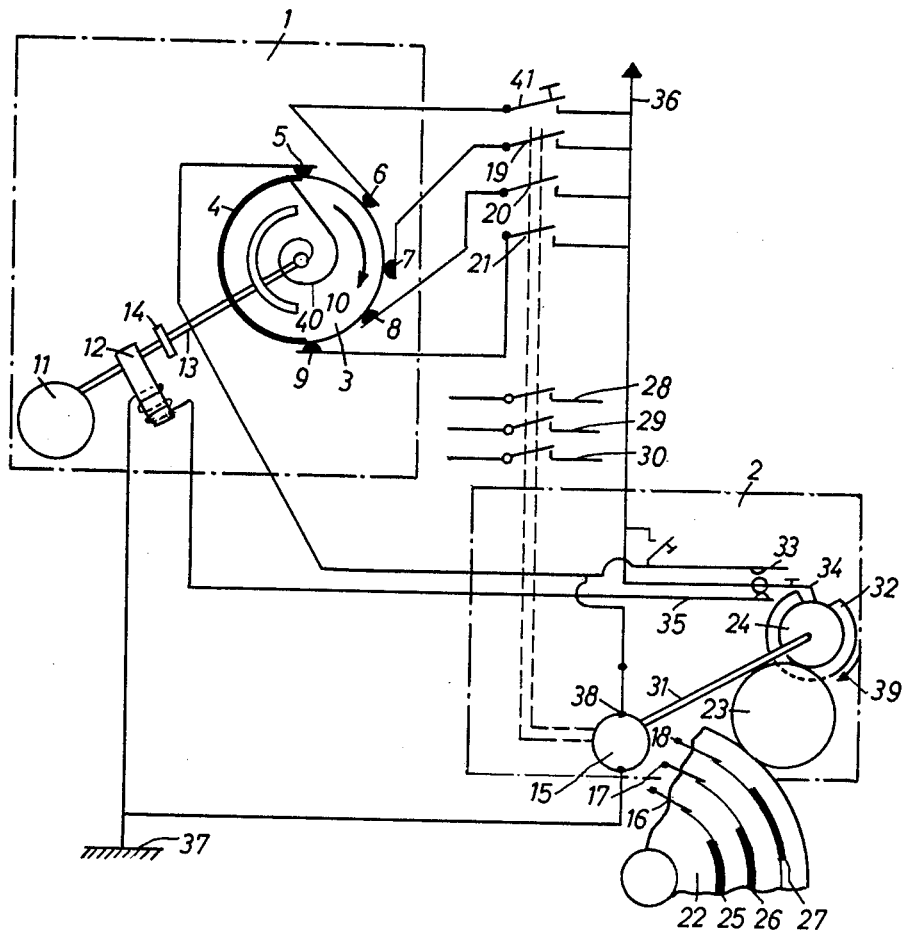
INVENTOR:
WALTER HOLZER
By Toulmin & Toulmin
Attorneys United States Patent Office 3,046,421
Patented July 24, 1962

3,046,421
IMPULSE DEVICE CONNECTED WITH A MOTOR IN AN AUTOMATIC CUT-OUT FOR THE PROGRAM CONTROL IN WASHING-MACHINES
Walter Holzer, Schutzenrain, Meersburg (Bodensee), Germany
Filed Mar. 16, 1960, Ser. No. 15,388
Claims priority, application Germany Mar. 19, 1959
6 Claims. (Cl. 307—141)

The present invention is related to a time control device, particularly as used for washing machines. It is important that a precise program control be available that fits all kinds of programs and that this be accomplished with the lowest production costs and the least waste of space. It must be reliable and work faultlessly despite strong shocks, voltage oscillation and dampness. These conditions are especially important for the use of controls in dish-washing and in washing machines.

There are impulse devices already known, which operate the stepping of the program contacts using various long time impulses. There are also impulse devices known which step the program contacts strictly mechanically at pre-determined times. The disadvantage of these arrangements is that it is very difficult to accommodate the control apparatus when switching from long to short, and from short to long program time intervals. It is also difficult to set a program pre-selection by changing the program times in the said arrangements. These options are quite desirable, when one has to wash various kinds of clothes demanding different treatment.

It is a primary object of this invention to avoid these disadvantages and to construct the time or device in such a way that it is possible to switch the program contacts exactly in a pre-selected sequence, according to a pre-selected program. It is also possible to have the selection of further program sections take place easily, e.g. by pressing buttons. The primary feature of this invention is to be seen in providing a pulse device which assigns various periods of times to various program sections of a program control system. It Iis a further object of this invention, to provide short and long switching times in a program cycle. A further object of this invention is to change the program without altering the control itself, by changing the pulse duration or pulse times. It is also made possible to change whole sections of the control program by a corresponding pre-selection.

The object of this invention is achieved in the following manner. A variable timer or pulse device, at the end of a preselected pulse duration thereof, starts a drive motor for program contacts in a step switching and automatic cut-out circuit network, and subsequently at every step, both the pulse device and the automatic cut out are returned, independent of one another, to their initial or starting positions.

The cooperation of a timer with a motor in an automatic cut-out which steps the program contacts has various advantages. First, the timer is a device selectively producing an output pulse appearing at a preselected period of time after the timer was started. This pulse is used to start a motor. The impulse device, which returns to its initial position after every step permits precise short or long switching impulses, depending upon which path the impulse device takes. The automatic cut-out employed for stepwise running the motor for the program contacts, has the advantage that the switching always takes place from a definite initial position. It is also an important advantage, that both the impulse device i.e., giving timer impulses, as well as the driving of the program contacts do not make as much work in respect to precision, as the arrangements already mentioned do. In the usual arrangements, the cam discs give continuous time impulses and the stepping mechanism operates the program contacts. Subsequently, in these set-ups, the impulse device and the automatic cut-out and the motor return together to their initial positions. In that way eventual errors accumulate. In the set up devised by the invention, eventual errors occur only in a small area, and the constant return to the initial position obviates their accumulation.

An example of a construction of the invention is depicted in the drawing. Other characteristics of the invention can be seen from the description and drawing.

The drawing shows schematically the connection of a timer operating as a pulse device and a motor which steps the program contacts in an automatic cut-out circuit network.

In the drawing a timer or pulse device 1 is blocked out by a dash-dot contour line. A motor with automatic cut-out circuit network for stepwise actuating program contacts is denoted with reference numeral 2 and is also blocked out by a dash-dot line. The arrangements designated in the following as pulse device 1 and automatic cut-out 2 are connected either mechanically or electrically, but they are independent of one another insofar as each of the arrangements returns to its initial position independent from the other, as will be explained below. The drawing illustrates the initial or starting position of the several elements.

The example of impulse device 1 shown in the drawing consists of a disc 3 carrying a circumferentially disposed contact segment 4. Stationary sliding contacts 5, 6, 7, 8, 9 are arranged along the circumference of disc 3 at spatial intervals that can be adjusted. When disc 3 and its conducting contact segment 4 moves in the direction indicated by arrow 10, contact is made with those of sliding contacts 5–9 then touching contact segment 4.

Disc 3 is driven by motor 11 over a coupling 12 and a shaft 13. In the embodiment illustrated, coupling 12 is an electro-magnetic coupling. Shaft 13 furthermore has a friction coupling 14 disposed between coupling 12 and disc 3.

The automatic cut-out 2 first includes an electric motor 15 serving for stepwise moving a switching program disc 22. Switching disc 22 operates program contacts 16, 17, 18 for the washing machine itself, over trip cams 25, 26 and 27. Switching disc 22 operates auxiliary program contacts such as 19, 20, 21 and 28 and 29 and 30 which are shown. Still other program contacts can be operated by disc 22.

A motor 15 drives the switching disc over shaft 31 and a few intermediate gearing wheels 23 and 24. A trip cam 32 is seated on shaft 31 and operates a contact or interrupter system 34, 35, 33. One terminal of motor 15 is connected to a terminal 37, for example at ground potential. The other terminal of motor 15 denoted with reference numeral 38 is connected to a terminal 36 of a voltage potential provided for running the motor. If the pulse device interconnects terminal 38 and terminal 36 through one of its contacts 6 to 9, motor 15 starts to run. Subsequently, trip cam 32 rotates in the direction indicated by arrow 39, and closes contacts 33 and 34. In that way terminal 38 is directly connected to terminal 36. Motor 15 continues to rotate trip cam 32 until it has returned to its initial position as indicated, and contacts 33, 34 break the motor circuit. During one revolution of cam 32 switching disc 22 was moved one step further.

Motor 11 of pulse device 1 is preferably a constant speed motor and is always connected to a voltage supply source which can be the same as the operating voltage for motor 15. Electro-magnetic coupling 12 drivingly connects disc 3 and motor 11 when contacts 34, 35 are closed. When electro-magnetic coupling 12 is de-energized, it breaks the power transmission between motor 11 and disc 3 and a spiral spring 40 returns disc 3 from its momentary position back into the initial position illustrated.

To use couplings and a continuously running motor is practical so that the starting times can be free of inertia moments of the motor, which inertia moments might disturb the precision of the motor action in certain cases.

The system operates in the following manner: switching disc 22 closes program contact 20, which corresponds to a pre-selection of sliding contact 8; thus, a particular time interval for the switching action produced by switching disc 22 is preselected thereby.

Switching disc 22 remains in the switching position it has until contact segment 4 reaches sliding contact 8. In that moment motor terminal 38 is connected to terminal 36 over sliding contact 5, contact segment 4, sliding contact 8 and program contact 20. Motor 15 is started thereby and trip cam 32 closes automatic cut-out contact 33, 34 during one revolution of trip cam 32. Depending upon how contacts 33, 34, 35 are adjusted, the current to electro-magnetic coupling 12 through contacts 34, 35 is interrupted by lifting contact 34 from contact 35 either immediately or at the latest during the revolution of trip cam 32. In that way the power transmission from motor 11 to disc 3 is interrupted, and disc 3 is recoiled by spring 40 into the initial position shown. Then trip cam 32 completes one revolution and contacts 33, 34 open so as to stop motor 15. This is the cut-out self interruption of the step-switching programmer. Contacts 34, 35 are reclosed, coupling 12 re-energized and the pulse device 1 begins to run again in rotating disc 3 off its resting or initial position.

Contact 20 remains closed in the new position finally attained by switching disc 22 after completion of one step, and the pulse device 1 gives the next starting pulse to the automatic cut-out etc., after the same period of time has elapsed. This will be repeated until, in another position, contact 20 is opened by the trip cam of switching disc 22, and another contact, for example, contact 21 is closed. The pulse device 1 now sends a starting pulse to the automatic cut-out 2 only after contact segment 4 has reached sliding contact 9. The longer path of contact segment 4 corresponds to a longer time for this switching position. It can be clearly seen from the drawing that a shorter period of time or pulse duration is assigned to sliding contact 6 and a longer period of time or pulse duration to sliding contact 9. Pulse duration therefore is the time that disc 22 remains in a particular position until it is moved forward by another step, or, in other words every one of such steps is carried out after a period of time; called pulse duration, the length of which being determined by the selection of contacts 19, 20 and 21.

In the device as disclosed the pulse device i.e. disc 3 has returned to its initial or starting position before the step-movement of program disc 22 has been completed. In that way one can attain very short switching time intervals for the washing machine, and very quick steps in rapid sequence. The interdependence of returning the pulse device 1 and completing one step of stepper motor 15 always insures that any step is completed before a new time interval commences.

It is important, that the starting of drive motor 15 for the program contacts in the automatic cut-out circuit network 2 depends upon the path contact-segment 4 has travelled at a constant speed.

With a constant speed of disc 3 i.e. motor 11, the travelled distance of segment 4 is a measure of time and directly proportional thereto. The starting of the drive motor 15 for the stepping of the program contacts is a timed one.

Of course other ways of measuring time that lead to the starting of the drive motor 15 for the program contacts are conceivable.

It is essential only that the pulse sequence depends strictly on the time needed to bring the pulse device 1 (disc 3) from its initial position into contact with any of the selected sliding contacts 6 to 9. When a constantly running motor such as 11 is used for driving disc 3, it is also possible to have this motor provide for the drive for an auxiliary contact system simultaneously, e.g. to reverse the motor of the washing machine.

In order to predetermine the pulse durations as defined above, it is practical to have the pre-selection of the switching duration take place through the operating contacts 19, 20, 21, which are alternatingly closed. These contacts start the automatic cut-out via the corresponding sliding contacts 7, 8 and 9, respectively.

The auxiliary contacts 28, 29, 30 are program contacts which assign various switching time intervals to particular switching positions of the washing machine during the program cycle thereof, they are operated by the stepwise moved motor 15.

One can therefore effect changes in the program simply by adding auxiliary contacts.

It is particularly advantageous to arrange other sliding contacts on the impulse device, that lie in the circuit of the electrical parts of the washing machine. Using this arrangement one can make sure that the corresponding parts of the washing machine are not connected to voltage during the stepping, that is that these parts will not be turned on for a short time, accidently. This so-called blocking contact has particular importance when certain parts of the program consisting of a number of steps are to be by-passed quickly. This rapid bypassing can be effected by having the pre-selected program contacts bridge the pulse device and by having the motor in the automatic cut-out bridged for these switching positions.

A further advantage of this simple arrangement is that the sequence of the time intervals can be adjusted in shifting the relative position of sliding contacts 7, 8 and 9. One can easily adjust the times now, an advantage not to be had in the known arrangements.

A manually operated switch 41 makes it possible to connect sliding contact 6 to the automatic cut-out network 2 for a certain time independent of the program contacts. In that way one can have the switching disc 22 moved step-by-step until switch 41 is opened again. Alternatively switch 41 can be closed by thermostats or other parts, or it can be operated manually as stated, in order to by-pass particular program sections during the stepping.

Switch 41 is especially needed when all operating program contacts 19, 20, 21 each corresponding to a particular pulse duration, are opened. In this case, motor 15 remains without current through automatic cut-out network 2 until switch 41 is closed.

This invention can be used in all cases where one wants to use an impulse device and an automatic cut-out for the stepping of a switching disc, whereby all program variations are possible. Manual operation should be possible, that is, quick change, precise maintenance of all timed steps, and a versatility of all parts should be available, despite low production costs, limited space, and a great amount of precision.

I claim:

1. A program selector switching system comprising: a plurality of operating contacts; switching means for selectively opening and closing said contacts; an electric motor for driving said switching means; a circuit interrupter driven by said electric motor and governing the current supply thereto; a disc having a contact segment; a plurality of sliding contacts scanning said disc, being respectively connected in circuit with said operating contacts and being respectively associated thereto; controllable means for driving said disc; a contact for energizing said last mentioned driving means also operated by said circuit interrupter; a starter circuit for said electric motor including one of said operating contacts as selected by said switching means and an associated sliding contact; and spring means for recoiling said disc into a starting position when said means for driving said disc are rendered unenergized, which starting position is defined by an open-contact position with respect to said sliding contacts.

2. A program selector switching system comprising: a plurality of operating contacts; switching means for selectively opening and closing said contacts; an electric motor for driving said switching means; a circuit interrupter driven by said electric motor and governing the current supply thereto; a disc having a contact segment; a plurality of sliding contacts scanning said disc, being respectively connected in circuit with said operating contacts and being respectively associated thereto; a second motor for driving said disc; a magnetic coupling interposed between said disc and said second motor; a contact governing energization of said coupling and being also operated by said circuit interrupter; a starter circuit for said electric motor including one of said operating contacts as selected by said switching means and an associated sliding contact; and spring means for recoiling said disc into a starting position when said means for driving said disc are rendered unenergized, which starting position is defined by an open-contact position with respect to said sliding contacts.

3. Device as set forth in claim 2, said interrupter keeping said current supply circuit for said electric motor closed when keeping said contact for governing energization of said coupling open and vice versa.

4. Device as set forth in claim 2, comprising friction clutch means additionally interposed between said second motor and said disc.

5. A program selector switching system comprising: a plurality of operating contacts; switching means for selectively opening and closing said contacts; an electric motor for driving said switching means; a circuit interrupter driven by said electric motor and governing the current supply thereto; a rotatable disc having a circumferentially disposed contact segment; stationary sliding contacts disposed along said circumference at a mutual distance corresponding to different time intervals to be selected, said stationary contacts being respectively in circuit with said operating contacts; constant speed driving means for driving said disc; a contact also operated by said interrupter and energizing said constant speed driving means; a starter circuit for said electric motor including one of said operating contacts as selected by said switching means, and an associated sliding contact; and spring means for recoiling said disc into a starting position when said means for driving said disc are rendered unenergized, which starting position is defined by an open-contact position with respect to said sliding contacts.

6. A program selector switching system comprising: a plurality of operating contacts; switching means for selectively opening and closing said contacts, an electric motor for driving said switching means, a circuit interrupter driven by said electric motor and governing the current supply thereto; a cam disc driven by said electric motor; two switches operated by said cam disc so that one is open while the other is closed in alternating succession; circuit means for placing one of said switches in the supply circuit for said electric motor; a disc having a contact segment; a plurality of sliding contacts scanning said disc, being respectively connected in circuit with said operating contacts and being respectively associated thereto; controllable means for driving said last mentioned disc; circuit means for placing the other one of said switches into the supply circuit of said controllable means; a starter circuit for said electric motor including one of said operating contacts as selected by said switching means and an associated sliding contact; and spring means for recoiling said disc into a starting position when said means for driving said disc are rendered unenergized, which starting position is defined by an open-contact position with respect to said sliding contacts.

References Cited in the file of this patent
UNITED STATES PATENTS
2,599,234   Clark ------------------ June 3, 1952